(12) United States Patent
Sato (10) Patent No.: US 6,927,938 B2
(45) Date of Patent: Aug. 9, 2005

(54) THIN FILM MAGNETIC HEAD INTENDED TO DECREASE INDUCTANCE WITH TRACK NARROWING AND METHOD OF MANUFACTURING THE SAME

(75) Inventor: Kiyoshi Sato, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 420 days.

(21) Appl. No.: 10/150,957

(22) Filed: May 17, 2002

(65) Prior Publication Data

US 2002/0176206 A1 Nov. 28, 2002

Related U.S. Application Data

(62) Division of application No. 09/632,874, filed on Aug. 4, 2000, now Pat. No. 6,515,825.

(30) Foreign Application Priority Data

Aug. 6, 1999 (JP) .............................................. 11-223813

(51) Int. Cl.⁷ ................................................. G11B 5/39
(52) U.S. Cl. ...................................................... 360/126
(58) Field of Search .................................. 360/126, 317, 360/123; 29/603.13, 603.14, 603.15

(56) References Cited

U.S. PATENT DOCUMENTS

| | | |
|---|---|---|
| 5,452,164 A | 9/1995 | Cole et al. |
| 5,649,351 A | 7/1997 | Cole et al. |
| 5,652,687 A | 7/1997 | Chen et al. |
| 5,802,700 A | 9/1998 | Chen et al. |
| 6,130,809 A * | 10/2000 | Santini ........................ 360/317 |
| 6,337,841 B1 * | 1/2002 | Kim et al. .............. 369/112.06 |
| 6,342,990 B1 * | 1/2002 | Sasaki ......................... 360/126 |
| 6,381,093 B2 * | 4/2002 | Yoshida et al. .............. 360/126 |
| 6,388,845 B1 * | 5/2002 | Sasaki ......................... 360/317 |
| 6,558,561 B2 * | 5/2003 | Sasaki ........................... 216/22 |
| 6,597,543 B1 * | 7/2003 | Saitho et al. ................ 360/317 |

* cited by examiner

Primary Examiner—A. J. Heinz
Assistant Examiner—Mark Blouin
(74) Attorney, Agent, or Firm—Brinks Hofer Gilson & Lione (57) ABSTRACT

The present invention provides a thin film magnetic head in which a first coil layer is formed at the back of a track width control portion. The first coil layer being location nearer a bottom core layer than the junction surface of a track width control portion and an upper core layer. With a two-layer structure, the width of the coil layer can be decreased. The height from the top of the bottom core layer to the top of an insulating layer can be decreased. The insulating layer covering a second coil layer can be decreased, thereby shortening the magnetic path and decreasing inductance.

6 Claims, 9 Drawing Sheets

FIG. 19
PRIOR ART ered to have an inner width dimension
THIN FILM MAGNETIC HEAD INTENDED TO DECREASE INDUCTANCE WITH TRACK NARROWING AND METHOD OF MANUFACTURING THE SAME This application is a divisional application of U.S. application Ser. No. 09/632,874 filed on Aug. 4, 2000, now U.S. Pat. No. 6,515,825 entitled "Thin Film Magnetic Head Intended to Decrease Inductance With Track Narrowing and Method of Manufacturing the Same."

BACKGROUND OF THE INVENTION

1. Field of the Invention

The present invention relates to a thin film magnetic recording head used for, for example, a floating magnetic head. More particularly, the present invention relates to a thin film magnetic head intended to decrease inductance to be made adaptable to higher recording frequencies, and a method of manufacturing the same.

2. Description of the Related Art

Figure 18:
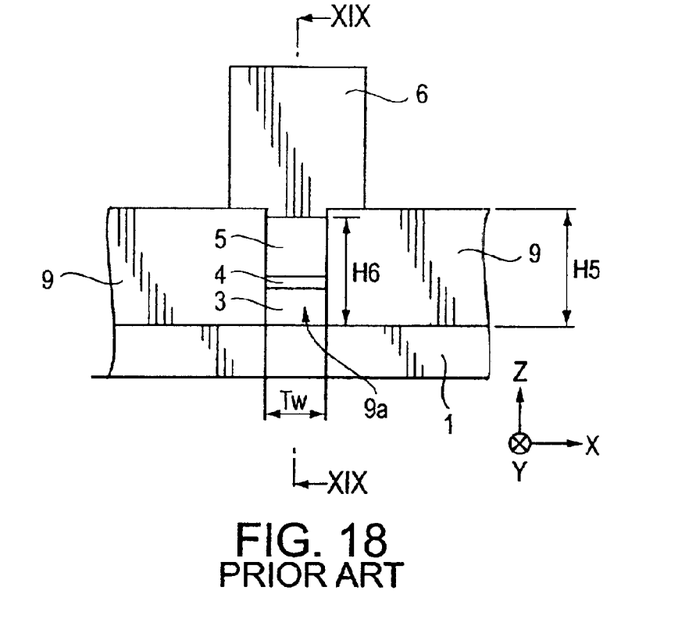
FIG. 18 is a partial front view showing the structure of a conventional thin film magnetic head according to the prior art.
Figure 19:
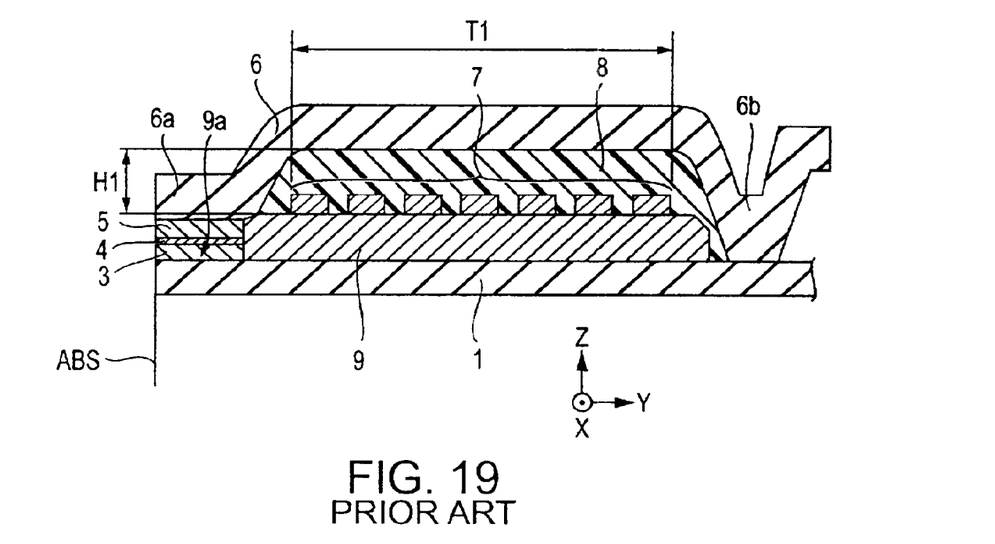
FIG. 19 is a partial sectional view of the thin film magnetic head shown in FIG. 18 taken along line XIX—XIX in FIG. 18.

FIG. 18 is a partial front view showing the structure of a conventional thin film magnetic head (inductive head). FIG. 19 is a partial sectional view of the thin film magnetic head shown in FIG. 18 taken along line XIX—XIX, as viewed from the direction of arrows.

In FIGS. 18 and 19, bottom core layer 1 is made of a magnetic material such as permalloy or the like. Insulating layer 9 is formed on the bottom core layer 1.

The insulating layer 9 has a trench 9a which is formed in the height direction (the Y direction shown in FIG. 18) from the air bearing surface (referred to as "ABS" hereinafter) facing a recording medium to have an inner width dimension equal to the track width Tw.

Also, a bottom pole layer 3 magnetically connected to the bottom core layer 1, a gap layer 4 and a top pole layer 5 magnetically connected to a top core layer 6 are formed in the trench 9a by plating in turn from the bottom.

As shown in FIG. 19, a coil layer 7 patterned in a spiral shape is provided on the portion of the insulating layer 9, which is located at the back of the trench 9a formed in the insulating layer 9 in the height direction (the Y direction shown in FIG. 19).

The coil layer 7 is covered with an organic insulating layer 8 of resist or the like. The top core layer 6 is formed on the organic insulating layer 8. The front end 6a of the top core layer 6 is magnetically connected to the top pole layer 5. The base end 6b is magnetically connected to the bottom core layer 1.

In the inductive head shown in FIGS. 18 and 19, when a recording current is supplied to the coil layer 7, a recording magnetic field is induced in each of the top and bottom core layers 1 and 6. A magnetic signal is recorded on a recording medium such as a hard disk by a leakage magnetic field between the bottom pole layer 3 and the top pole layer 5 magnetically connected to the bottom core layer 1 and the top core layer 6, respectively.

In the inductive head shown in FIGS. 18 and 19, the bottom pole layer 3, the gap layer 4 and the top pole layer 5 are locally formed with the track width Tw near the ABS (the surface facing the recording medium). This type of inductive head is adaptable to narrower tracks.

The method of manufacturing the inductive head shown in FIGS. 18 and 19 is described below. First, the insulating layer 9 is formed on the bottom core layer 1. The trench 9a having the track width Tw is formed in the insulating layer 9 with a predetermined length from the ABS in the height direction.

Next, the bottom pole layer 3, the gap layer 4 and the top pole layer 5 are continuously formed by plating in the trench 9a. The coil layer 7 is patterned on the portion of the insulating layer 9, which is located at the back of the trench 9a formed in the insulating layer 9.

Furthermore, the coil layer 7 is covered with the organic insulating layer 8. The top core layer 6 is formed by frame plating to extend from the top pole layer 5 to the organic insulating layer 8 to complete the inductive head shown in FIGS. 18 and 19.

It is necessary to decrease the inductance of the inductive head with track narrowing accompanying increases in recording density and recording frequency in future.

In order to decrease the inductance, the magnetic path formed from the bottom core layer 1 to the top core layer 6 must be shortened. Thus, the width dimension T1 of the coil layer 7 formed between the front end 6a and the base end 6b of the top core layer 6 must be decreased. By decreasing the width dimension T1 of the coil layer 7, the length of the top core layer 6 can be shortened to realize a short magnetic path.

A possible method of decreasing the width dimension T1 of the coil layer 7 without changing the number of the turns of the coil layer 7 is one in which the coil layer 7 is formed in a laminated structure comprising two layers.

However, in the structure of the thin film magnetic head shown in FIGS. 18 and 19, even when the coil layer 7 has a simple two-layer laminated structure, the magnetic path cannot be shortened so that it is made adaptable to higher recording frequency in future, thereby causing difficulties in appropriately decreasing inductance.

This is because the coil layer 7 is formed on the thick insulating layer 9. As shown in FIG. 18, the insulating layer 9 has a thickness H5 which is more than the total thickness H6 of the bottom pole layer 3, the gap layer 4 and the top pole layer 5. Therefore, assuming that the surface of the top pole layer 5 is a reference plane, the coil layer 7 is formed on the insulating layer 9 nearer the top core layer 6 than the reference plane, as shown in FIG. 19.

Therefore, with the coil layer 7 having a two-layer laminated structure, the width dimension T1 of the coil layer 7 can be decreased, but the height from the top of the bottom core layer 1 to the top of the insulating layer 8 formed to cover the coil layer 7 is substantially increased. As a result, the magnetic path cannot be much shortened, and the inductance cannot be appropriately decreased.

In the inductive head having the structure shown in FIG. 19, with the coil layer 7 having two-layer laminated structure, the thickness dimension H1 of the organic insulating layer 8 formed to cover the coil layer 7 is increased. Thus the organic insulating layer 8 significantly rises from the surface of the top pole layer 5 as the reference plane.

Therefore, the top core layer 6 cannot be easily formed by frame plating to extend from the top pole layer 5 to the organic insulating layer 8, thereby causing the problem of making it impossible to form the top core layer 6, particularly the portion near the front end 6a thereof, in a predetermined shape.

SUMMARY OF THE INVENTION

The present invention has been achieved for solving the above problems. An object of the invention is to provide a thin film magnetic head in which the magnetic path can be shortened to decrease inductance, and a method of manufacturing the thin film magnetic head.

A thin film magnetic head of the present invention comprises a bottom core layer, a top core layer, and a track width control portion located between the bottom and top core layers on the surface facing a recording medium and having a controlled dimension in the direction of the track width. The track width control portion comprises a gap layer magnetically insulating at least one of the bottom and top pole layers connected to the bottom and top core layers, respectively, from each of the pole layers, or one of the core layers from the corresponding one of the pole layers. When the junction surface between the track width control portion and the top core layer is the reference plane, a coil layer for inducing a recording magnetic field in the bottom and top core layers is located at the back of the track width control portion in the height direction. The upper surface of the coil layer is located nearer the bottom core layer than the reference plane. Furthermore, an insulating layer is provided between the reference plane and the bottom core layer. The coil layer is buried in the insulating layer. The top core layer is formed to extend from the track width control portion to the insulating layer so that the base end of the top core layer is magnetically connected to the bottom core layer.

In the present invention, in order to manufacture the thin the thin film magnetic head adaptable to future increases in recording density and recording frequency, particularly, the formation position of the coil layer is differentiated from that of a conventional head to realize a short magnetic path and decrease conductance.

As described above, the coil layer is located at the back of the track width control portion formed between the bottom and top core layers in the height direction. The junction surface between the track width control portion and the top core layer is the reference plane. The coil layer is located nearer the bottom core layer than the reference plane. The coil layer is buried in the insulating layer provided between the bottom core layer and the reference plane.

In the present invention, the coil layer is formed to be buried in the insulating layer formed at the back of the track width control portion. This is different from the structure of the inductive head shown in FIGS. 18 and 19 in which the coil layer 7 is formed on the insulating layer 9.

Since the coil layer is formed to be buried in the insulating layer formed at the back of the track width control portion, the height dimension from the top of the bottom core layer to the top of the insulating layer formed to cover the coil layer can be decreased to decrease the length of the top core layer, as compared with a conventional magnetic head. Therefore, it is possible to realize a short magnetic path, and appropriately decrease inductance.

In the present invention, the insulating layer preferably comprises an inorganic insulating layer, or comprises an organic insulating layer located in the pitch intervals of a conductor, which constitutes the coil layer, and an inorganic insulating layer which fills the other portions.

In the present invention, the insulating layer formed to cover the coil layer and the reference plane preferably lie in the same plane.

In this case, a second coil layer is preferably formed on the insulating layer directly or with another layer provided therebetween so as to be electrically connected to the coil layer. The top core layer is preferably formed on an insulating layer formed to cover the second coil layer.

As described above, with the coil layer having a two-layer laminated structure, the width of the coil layer can be decreased. Also, in the present invention, the first coil layer is formed within the insulating layer formed at the back of the track width control portion, and thus the height from the top of the bottom core layer to the top of the insulating layer formed to cover the second coil layer can be decreased, as compared with a conventional inductive head comprising a coil layer having a two-layer laminated structure. Therefore, the magnetic path formed from the bottom core layer to the top core layer can be shortened to decrease inductance.

Particularly, in the present invention, the first coil layer is formed to be buried in the insulating layer formed at the back of the track width control portion. The surface of the insulating layer is planarized in the same plane as the surface of the track width control portion.

Therefore, the second coil layer can be precisely patterned on the insulating layer directly or with another layer provided therebetween.

Furthermore, in the present invention, the first coil layer is formed within the insulating layer formed at the back of the track width control portion. The second coil layer is formed on the planarized surface of the insulating layer. Therefore, assuming that the surface of the track width control portion is the reference plane, the rise of the insulating layers formed to cover the coil layers corresponds to the rise of the insulating layer formed to cover the second coil layer, thereby permitting the formation of the top core layer extending from the track width control portion to the insulating layer on the second coil layer with high pattern precision.

In the present invention, the gap layer is preferably made of a nonmagnetic metallic material which can be plated. As the nonmagnetic metallic material, at least one material is preferably selected from NiP, NiPd, NiW, NiMo, Au, Pt, Rh, Pd, Ru, and Cr.

A method of manufacturing a thin film magnetic head of the present invention comprises the following steps:

(a) The step of forming a track width control portion on a bottom core layer with a predetermined width dimension and a predetermined length from the surface facing a recording medium in the height direction, the track width control portion comprising a bottom pole layer, a nonmagnetic gap layer, and a top pole layer, the bottom pole layer and the nonmagnetic gap layer, or the nonmagnetic gap layer and the top pole layer;

(b) The step of forming an insulating base layer on the portion of the bottom core layer, which is located at the back of any of the track width control portions in the height direction, and forming a coil layer on the insulating base layer so that the top of the coil layer is nearer the bottom core layer than the top of the track width control portion;

(c) The step of forming an insulating layer to cover the track width control portion and the coil layer;

(d) The step of planarizing the top surface of the insulating layer so that the planarized top surface and the top surface of the track width control portion lie in the same plane; and (e) The step of forming the top core layer to extend from the track width control portion to the insulating layer.

In the present invention, the track width control portion comprising the pole layer and the gap layer is first formed on the bottom core layer with the predetermined length from the surface facing the recording medium in the height direction. Therefore, the insulating layer 9 shown in FIGS. 18 and 19 is not formed at the back of the track width control portion, and thus the coil layer can be formed on the portion of the bottom core layer, which is located at the back of the track width control portion, with the insulating base layer provided therebetween.

In the present invention, the insulating layer made of alumina is then formed to extend from the track width control portion to the coil layer, and the surface of the insulating layer is ground to the same plane as the surface of the track width control portion to planarize the surface of the insulating layer in the same plane as the surface of the track width control portion.

At this time, the coil layer is buried in the insulating layer.

In contrast, in the thin film magnetic head shown in FIGS. 18 and 19, the coil layer 7 cannot be formed within the insulating layer 9 during the manufacturing process.

Namely, in the method of manufacturing the thin film magnetic head shown in FIGS. 18 and 19, the insulating layer 9 is first formed on the bottom core layer 1, and thus the coil layer 7 is inevitably formed on the insulating layer 9.

As described above, the manufacturing method of the present invention can form the coil layer at the back of the track width control portion in the height direction, which is formed between the bottom core layer and the top core layer, so that assuming that the junction surface between the track width control portion and the top core layer is the reference plane, the coil layer is located nearer the bottom core layer than the reference plane.

In the present invention, the step (c) preferably comprises forming an inorganic insulating layer as the insulating layer, and the step (d) preferably comprises polishing the insulating layer so that the tops of the track width control portion and the inorganic insulating layer lie in the same plane.

Alternatively, in the present invention, the step (c) preferably comprises filling the pitch intervals of the conductor of the coil layer with an organic insulating layer, and then forming an inorganic insulating layer on the organic insulating layer and the coil layer, and the step (d) preferably comprises polishing the insulating layer so that the top surfaces of the track width control portion and the inorganic insulating layer lie in the same plane.

The present invention preferably further comprises the following step (f) after the above step (d).

(f) The step of forming a second coil layer on the planarized surface of the insulating layer directly or with another layer provided therebetween so that the second coil layer is electrically connected to the first coil layer.

In the present invention, the step (a) preferably comprises forming the gap layer by plating together with the pole layers. In this case, as the nonmagnetic metallic material which forms the gap layer and which can be plated, at least one material is preferably selected from NiP, NiPd, NiW, NiMo, Au, Pt, Rh, Pd, Ru, and Cr.

DESCRIPTION OF THE PREFERRED EMBODIMENTS

Figure 1:
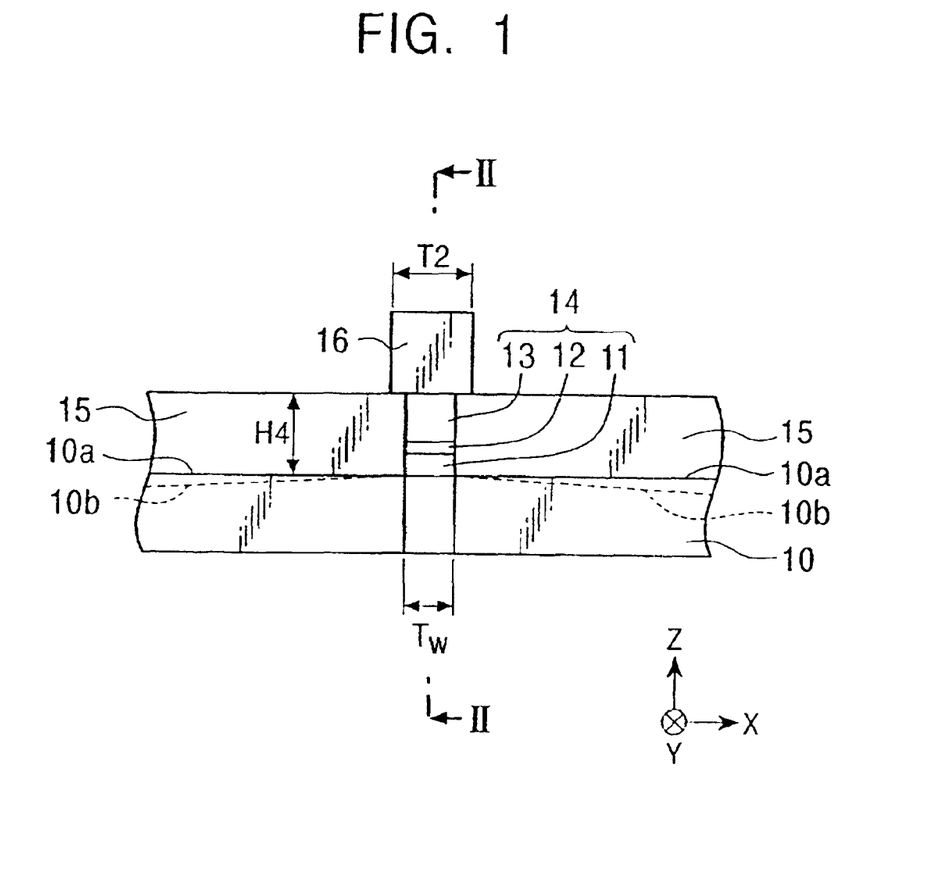
FIG. 1 is a partial front view showing the structure of a thin film magnetic head in accordance with an embodiment of the present invention.
Figure 2:
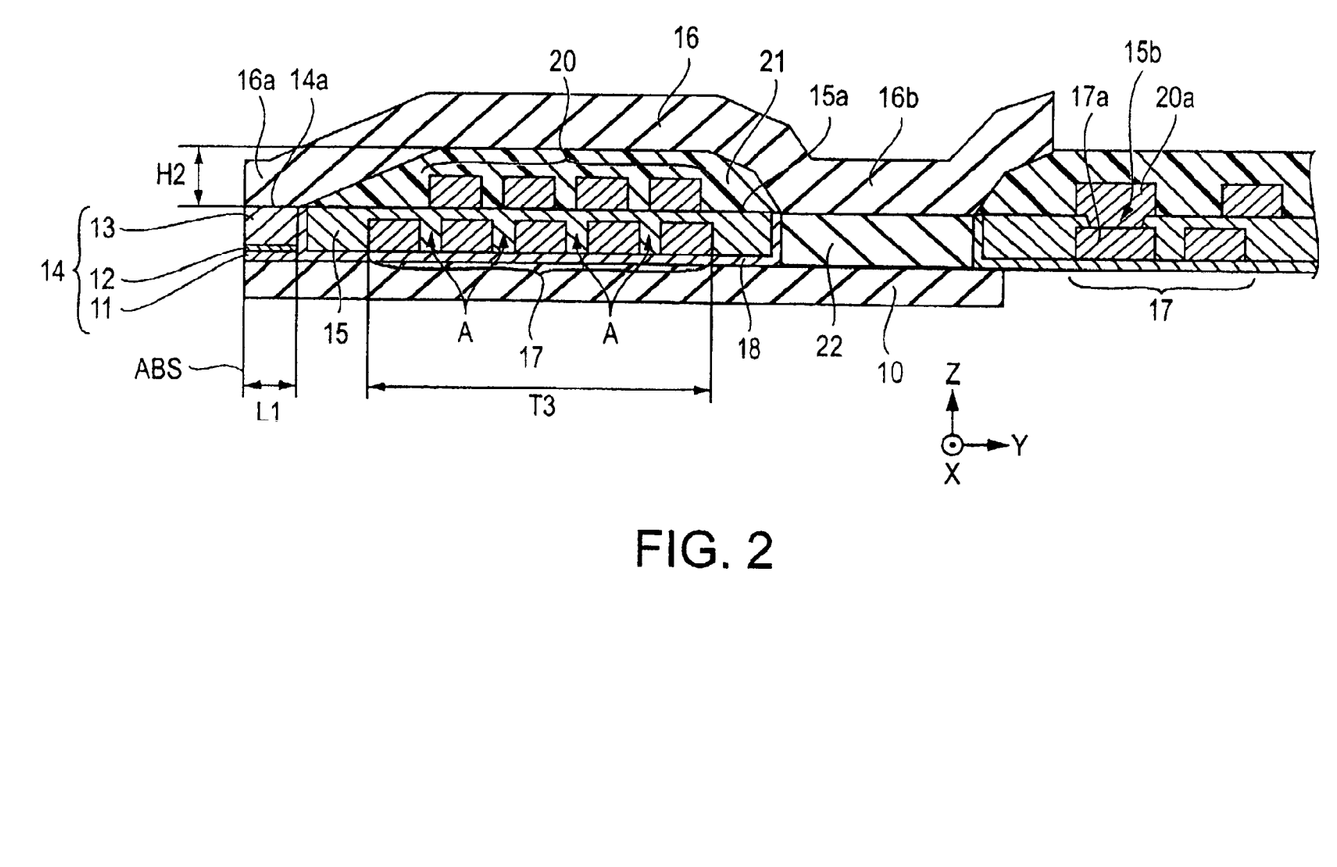
FIG. 2 is a partial sectional view of the thin film magnetic head shown in FIG. 1 taken along line II—II in FIG. 1.

FIG. 1 is a partial front view showing the structure of a thin film magnetic head according to an embodiment of the present invention. FIG. 2 is a partial sectional view of the thin film magnetic head shown in FIG. 1 taken along line II—II in FIG. 1, as viewed from the direction of arrows.

The thin film magnetic head shown in FIG. 1 is a recording inductive head. A reproducing head (MR head) using a magnetoresistive effect may be laminated below the inductive head of the present invention.

In FIGS. 1 and 2, a bottom core layer 10 is made of a magnetic material such as permalloy or the like. When the reproducing head is laminated below the bottom core layer 10, a shield layer may be provided apart from the bottom core layer 10, for protecting a magnetoresistive element from noise. Alternatively, the bottom core layer 10 may be caused to function as a top shield layer of the reproducing head without a separate shield layer provided.

As shown in FIG. 1, the top surface 10*a* of the bottom core layer 10 extending from a bottom pole layer 11, which will be described below, may be formed to extend in parallel with the direction (the X direction shown in FIG. 1) of the track width. Alternatively, inclined surfaces 10*b*, inclined in the direction away from the top core layer 16, may be formed in the bottom core layer 10. By forming the inclined surfaces 10*b* at the top of the bottom core layer 10, write fringing can be further appropriately prevented.

As shown in FIG. 1, a track width control portion 14 is formed with the track width Tw on the bottom core layer 10. The track width Tw is preferably about 0.7 $\mu$m or less, and more preferably about 0.5 $\mu$m or less. This permits the manufacture of a thin film magnetic head adaptable to a narrower track.

In the embodiment shown in FIGS. 1 and 2, the track width control portion 14 has a laminated structure comprising three layers, i.e., the bottom pole layer 11, a gap layer 12, and a top pole layer 13. The pole layers 11 and 13, and the gap layer 12 will be described below.

As shown in FIGS. 1 and 2, the bottom pole layer 11 serving as the lowermost layer of the track width control portion 14 is plated on the bottom core layer 10. The bottom pole layer 11 is magnetically connected to the bottom core layer 10, and may be made of a material different from or the same as the material of the bottom core layer 10. Also, the bottom pole layer 11 may comprise a single layer film or a multilayer film.

As shown in FIGS. 1 and 2, the nonmagnetic gap layer 12 is laminated on the bottom pole layer 11.

In the present invention, the gap layer 12 is preferably made of a nonmagnetic metallic material and formed on the bottom pole layer 11 by plating. In the present invention, as the nonmagnetic metallic material, at least one material is preferably selected from NiP, NiPd, NiW, NiMo, Au, Pt, Rh, Pd, Ru, and Cr. The gap layer 12 may comprise a single layer film or a multilayer film.

Next, the top pole layer 13 is formed on the gap layer 12 by plating so as to be magnetically connected to a top core layer 16, which will be described below. The top pole layer 13 may be made of a material different from or the same as the material of the top core layer 16, and may comprise a single layer film or a multilayer film.

With the gap layer 12 made of a nonmagnetic metallic material, the bottom pole layer 11, the gap layer 12 and the top pole layer 13 can be continuously formed by plating.

In the present invention, the structure of the track width control portion 14 is not limited to the laminated structure comprising the three layers. Namely, the track width control portion 14 may have any film structure as long as it comprises at least one of the bottom pole layer 11 connected to the bottom core layer, and the top pole layer 13 connected to the top core layer 16, and the gap layer 12 for magnetically insulating the pole layers or magnetically insulating one of the core layers from the one of the pole layers.

As described above, the bottom and top pole layers 11 and 13, which are part of the track width control portion 14, may be made of materials different from or the same as the materials of the core layers to which the pole layers are respectively magnetically connected. However, in order to increase the recording density, the bottom pole layer 11 and the top pole layer 13, which are opposed to the gap layer 12, preferably have higher saturation magnetic flux densities than those of the core layers to which the pole layers are respectively magnetically connected. With the bottom and top pole layers 11 and 13 having high saturation magnetic flux densities, a recording magnetic field can be concentrated in the vicinity of the gap, thereby improving the recording density.

As shown in FIG. 1, the track width control portion 14 has a the thickness dimension H4. For example, the thickness of the bottom pole layer 11 is about 0.4 $\mu$m. The thickness of the gap layer 12 is about 0.2 $\mu$m. The thickness of the top pole layer 13 is about 2 $\mu$m.

As shown in FIG. 2, the track width control portion 14 has a length dimension L1 from the surface (ABS) facing the recording medium in the height direction (the Y direction shown in FIG. 2).

The length dimension L1 is defined as the gap depth Gd which is set to a predetermined length because it significantly influences the electric characteristics of the thin film magnetic head. Although, in the embodiment shown in FIG. 2, the gap depth Gd is determined by the length dimension L1 of the track width control portion 14, another method of determining the gap depth Gd using a Gd determining insulating layer (not shown) can be used.

In order to determine the gap depth Gd by using the Gd determining insulating layer, for example, the Gd determining insulating layer is formed on the bottom core layer 10 so that the gap depth Gd is defined by the length from the front end of the Gd determining insulating layer to the ABS.

In the present invention, as shown in FIG. 1, an insulating layer 15 is exposed at the surface (the ABS) facing the recording medium on both sides of the track width control portion 14.

In the present invention, attention must be paid to the point that the insulating layer 15 has a function different from the insulating layer 9 exposed at the surface facing the recording medium shown in FIG. 18.

Namely, the insulating layer 9 shown in FIG. 18 is used for adapting to track narrowing. The trench 9*a* is formed in the insulating layer 9, in which the internal width dimension is defined as the track width Tw on the surface facing the recording medium. The bottom pole layer 2, the gap layer 4 and the top pole layer 5 are formed in the trench 9*a* by plating.

In contrast, the insulating layer 15 of the present invention is a coil insulating layer used for covering the coil layer (first coil layer) 17 shown in FIG. 2. Unlike the insulating layer 9 shown in FIG. 18, no trench is formed, in which the internal width dimension is defined as the track width Tw.

Therefore, the function of the insulating layer 15 of the present invention, which is different from the insulating layer 9 shown in FIG. 18, is due to the manufacturing method below. The manufacturing method of the present invention can form the coil layer 17 on the bottom core layer 10 without the insulating layer 15 provided therebetween.

In the present invention, as shown in FIG. 2, the coil layer 17 is formed at the back of the track width control portion 14 in the height direction (the Y direction shown in FIG. 2). The junction surface between the track width control portion 14 and the top core layer 16 is the reference plane, the coil layer 17 is located nearer the bottom core layer 10 than the reference plane.

As shown in FIG. 2, an insulating base layer 18 is formed between the bottom core layer 10 and the coil layer 17, for ensuring insulation between both layers. The insulating base layer 18 is preferably made of an insulating material comprising at least one of AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

As shown in FIG. 2, the coil layer 17 made of, for example, Cu is formed in a spiral pattern on the insulating base layer 18 with the coil center 17a as the center. Also, as shown in FIG. 2, the coil layer 17 is covered with the insulating layer 15 which is exposed at the surface (ABS) facing the recording medium, as described above (refer to FIG. 1).

In the embodiment shown in FIGS. 1 and 2, the insulating layer 15 preferably comprises an inorganic insulating layer made of an inorganic material. As the inorganic material, at least one is preferably selected from $Al_2O_3$, SiN, and $SiO_2$.

In the present invention, as shown in FIG. 2, a second coil layer 20 is formed in a spiral pattern on the coil layer 17 with the inorganic layer 15 provided therebetween. In order to form such a two-layer laminated structure coil, it is necessary to form a hole (contact portion) 15b in the portion of the inorganic insulating layer 15 which covers the coil center 17a of the coil layer 17 as the first coil layer so that the coil center 20a of the second coil layer 20 is electrically connected to the coil center 17a of the coil layer 17 through the contact portion 15b.

In forming the second coil layer 20, as shown in FIG. 2, the surface 15a of the inorganic insulating layer 15 which covers the coil layer 17 is preferably planarized to the same plane as the junction surface 14a of the track width control portion 14.

With the inorganic insulating layer 15 having the planarized surface, the second coil layer 20 can be formed on the inorganic insulating layer 15 with high pattern precision. Therefore, the pitch of the conductor which constitutes the second coil layer 20 can be decreased to decrease the size of the second coil 20. The second coil layer 20 may be patterned on the inorganic insulating layer 15 with another insulating interlayer (not shown) provided therebetween.

As shown in FIG. 2, the second coil layer 20 is coated with an upper insulating layer 21 made of an organic material such as resist, polyimide, or the like. The top core layer 16 is patterned on the insulating layer 21.

The top core layer 16 is formed so that the front end 16a contacts the track width control portion 14. The base end 16b is magnetically connected to a lifting layer 22 made of a magnetic material and formed on the bottom core layer 10. The lifting layer 22 is not necessarily formed. In this case, the base end 16b of the top core layer 16 is extended to the bottom core layer 10 to be magnetically connected directly to the bottom core layer 10. As shown in FIG. 1, the width dimension T2 of the top core layer 16 is greater than the track width Tw.

In the inductive head shown in FIGS. 1 and 2, when a recording current is supplied to the coil layer 17 and the second coil layer 20, a recording magnetic field is induced in the bottom core layer 10 and the top core layer 16 to produce a leakage magnetic field between the bottom and top pole layers 11 and 13 which are opposed to each other with the gap layer 12 provided therebetween in the track width control portion 14 so that a magnetic signal is recorded on the recording medium such as a hard disk by the leakage magnetic field.

In the inductive head of the present invention, the coil has the two-layer laminated structure. The reason for forming the coil having the two-layer laminated structure is that the width dimension T3 of the coil layer 17 is decreased to shorten the magnetic path formed from the bottom core layer 10 to the top core layer 16, thus decreasing inductance and manufacturing a thin film magnetic head adaptable to higher recording frequency in future. As shown in FIG. 2, with the first coil layer 17 of 5 turns, and the second coil layer 20 of 4 turns, it has been confirmed that the width dimension T3 of the coil layer 17 can be decreased to about 20 $\mu$m.

In the present invention, as shown in FIG. 2, the first coil layer 17 is formed at the back of the track width control portion 14 in the height direction. The junction surface between the track width control portion 14 and the top core layer 16 is the reference plane. The first coil layer 17 is located nearer the bottom core layer 10 than the reference plane. Therefore, the height from the top of the bottom core layer 10 to the top of the upper insulating layer 21 covering the second coil layer 20 can be decreased, as compared with a conventional thin film magnetic head in which the coil layer has the two-layer laminated structure (refer to FIG. 19).

Therefore, in the present invention, a short magnetic path can be appropriately realized. The inductance can be decreased, thereby manufacturing a thin film magnetic head adaptable to higher recording frequency in future.

The thin film magnetic head of the present invention is also adaptable to track narrowing. The method of controlling the track width Tw of the track width control portion 14 will be described in detail below in the manufacturing method. In the present invention, the track width Tw of the track width control portion 14 can be set to about 0.7 $\mu$m or less, and preferably about 0.5 $\mu$m or less, as described above. This dimension is a numerical value lower than the resolution limit of exposure and development of resist.

In one aspect of the present invention, the junction surface 14a between the track width control portion 14 and the top core layer 16 is the reference plane, the coil layer 17 is formed nearer the bottom core layer 10 than the reference plane. Therefore, the inorganic insulating layer 15 which covers the coil layer 17 does not project from the junction surface 14a of the track width control portion 14. Even if the inorganic insulating layer 15 projects from the reference surface 14a, the projection is not so high.

Particularly, in the embodiment shown in FIG. 2, the insulating layer 15 which covers the coil layer 17 has the planarized surface 15a in the same plane as the junction surface 14a of the track width control portion 14. Therefore, the second coil layer 20 can be easily formed on the insulating layer 15. At the same time, the height of the insulating layer which covers the coil rising from the junction surface 14a of the track width control portion 14 corresponds to the height H2 of the upper insulating layer 21 which covers the second coil layer 20.

Therefore, in an embodiment of the thin film magnetic head of the present invention, the magnetic path can be shortened to decrease the inductance. The top core layer 16 can be formed with high pattern precision to extend from the track width control portion 14 to the upper insulating layer 21.

Although, in the embodiment shown in FIG. 2, the coil has the two-layer structure, the coil may have a single-layer structure. Namely, in FIG. 2, the total turn number of the first coil layer 17 and the second coil layer 20 is 9. This turn number of 9 may be given by only the single coil layer 17.

With the single coil layer 17 alone, the top core layer 16 is patterned on the inorganic insulating layer 15 which covers the coil layer 17.

With the single coil layer 17 alone, the width dimension T3 of the coil layer 17 formed between the front end 16a and the base end 16b of the top core layer 16 is increased. The inductance does not decrease as compared with the coil having the two-layer laminated structure. However, the inductance is decreased as compared with the inductive head comprising the single coil layer shown in FIG. 19.

Namely, in the present invention, as described above, assuming that the junction surface 14a between the track width control portion 14 and the top core layer 16 is the reference plane, the coil layer 17 is formed nearer the bottom core layer 10 than the reference plane. Conversely, in the inductive head shown in FIG. 19, the coil layer 7 is formed on the insulating layer 9 so that assuming that the junction surface between the top pole layer 5 and the top core layer 6 is the reference plane, the coil layer 7 is formed nearer the top core layer 6 than the reference plane.

Therefore, in the present invention, the height from the top of the bottom core layer 10 to the top of the insulating layer 15 which covers the coil layer 17 can be decreased, as compared with the inductive head shown in FIG. 19. It is thus possible to realize a short magnetic path, and appropriately decrease the inductance.

With the single coil layer 17 alone, the inorganic insulating layer 15 which covers the coil layer 17 does not necessarily have the planarized surface in the same plane as the junction surface 14a of the track width control portion 14. The insulating layer 15 may be projected from the junction surface 14a of the track width control portion 14.

Figure 3:
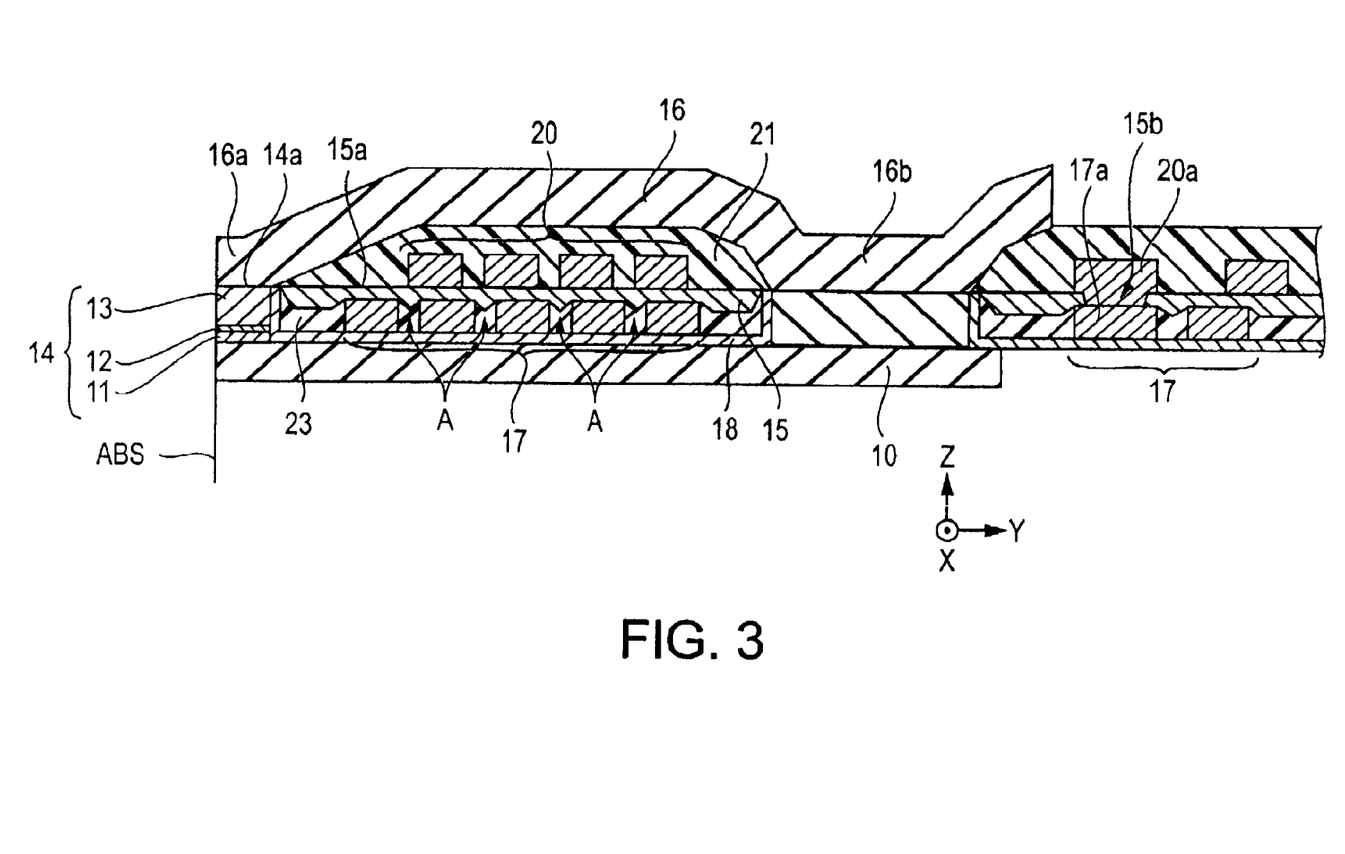
FIG. 3 is a partial sectional view showing the structure of a thin film magnetic head in accordance with a second embodiment of the present invention.

FIG. 3 is a partial sectional view showing a thin film magnetic head in accordance with a second embodiment of the preset invention. The thin film magnetic head shown in FIG. 3 has the same construction as the thin film magnetic head shown in FIG. 1 except that the structure of the insulating layer covering the coil layer 17 is different from the thin film magnetic head shown in FIG. 1.

In the thin film magnetic head shown in FIG. 3, a track width control portion 14 is formed with the track width Tw and a predetermined length dimension from the surface (ABS) facing the recording medium in the height direction (the Y direction shown in FIG. 3).

As shown in FIG. 3, a coil layer 17 is formed in a spiral pattern at the back of the track width control portion 14 in the height direction. The coil layer 17 is located nearer a bottom core layer 10 than the junction surface 14a of the track width control portion 14.

The coil layer 17 is formed on the bottom core layer 10 with an insulating base layer 18 provided therebetween for ensuring insulation between both layers. The coil layer 17 is coated to at least the surface thereof with an organic insulating layer 23 made of an organic material. As the organic material, existing materials such as resist and polyimide are used.

In this way, the reason for using the organic insulating layer 23 made of an organic material is that the intervals of the conductor of the coil layer 17 can securely be filled with the insulating layer 23.

Like in the embodiment shown in FIG. 2, in the use of an insulating inorganic material for the insulating layer 15 which covers the coil layer 17, the pitch intervals A of the conductor of the coil layer 17 cannot be appropriately filled with the inorganic insulating layer 15 due to a shadow effect in forming the inorganic insulating layer 15 by sputtering, to readily form voids in the pitch intervals A, which are not filled with the inorganic insulating layer 15.

When such voids are formed, gases contained in the voids expand by heat generated in a drive of the magnetic head, thereby causing the danger of deforming the film shape of the thin film magnetic head.

Therefore, it is preferable to prevent the formation of voids in the pitch intervals A of the conductor of the coil layer 17. In the present invention, the pitch intervals A of the conductor of the coil layer 17 are thus filled with the organic insulating layer 23 of resist or the like.

However, the organic insulating layer 23 must not be formed to the same position as the junction surface 14a of the track width control portion 14. The reason for this will be described later.

In the present invention, as shown in FIG. 3, the inorganic insulating layer 15 made of an inorganic material is formed on the coil layer 17 and the organic insulating layer 23 so that the top of the inorganic insulating layer 15 and at least the junction surface 14a of the track width control portion 14 lie in the same plane.

As the inorganic material used for the insulating layer 15, as described above, at least one material is selected from $Al_2O_3$, SiN, and $SiO_2$.

In the embodiment shown in FIG. 3, a second coil layer 20 is formed in a spiral pattern on the inorganic insulating layer 15. The surface 15a of the inorganic insulating layer 15 is preferably planarized in the same plane as the junction surface 14a of the track width control portion 14 because the second coil layer 20 can be formed with high pattern precision.

As shown in FIG. 3, the second coil layer 20 is coated with an upper insulating layer 21 made of an organic material such as resist, polyimide, or the like, and the top pole layer 16 is patterned on the upper insulating layer 21. The front end 16a of the top pole layer 16 is brought into contact with the track width control portion 14. The base end 16b is brought into contact with a lifting layer 22 made of a magnetic material and formed on the bottom core layer 10.

In this embodiment, the coil has a two-layer laminated structure. The first coil layer 17 is formed at the back of the track width control portion 14 in the height direction. The junction surface 14a between the track width control portion 14 and the top core layer 16 is the reference plane. The first coil layer 17 is located nearer the bottom core layer 10 than the reference plane. Therefore, the width of the coil layer 17 can be decreased. The height from the top of the bottom core layer 10 to the top of the upper insulating layer 21 formed to cover the second coil layer 20 can be decreased. Thereby the magnetic path may be shortened to decrease inductance.

Like in the thin film magnetic head shown in FIG. 2, the thin film magnetic head of this embodiment can be adapted to track narrowing.

Furthermore, the junction surface 14a between the track width control portion 14 and the top core layer 16 is the reference plane. The insulating layer, which covers the coil layer projecting from the reference plane, is not so thick, thereby permitting the formation of the top core layer 16 with high pattern precision.

FIG. 4 to 10 are drawings showing a method of manufacturing a thin film magnetic head according to an embodiment of the present invention as shown in FIG. 2.

Figure 4:
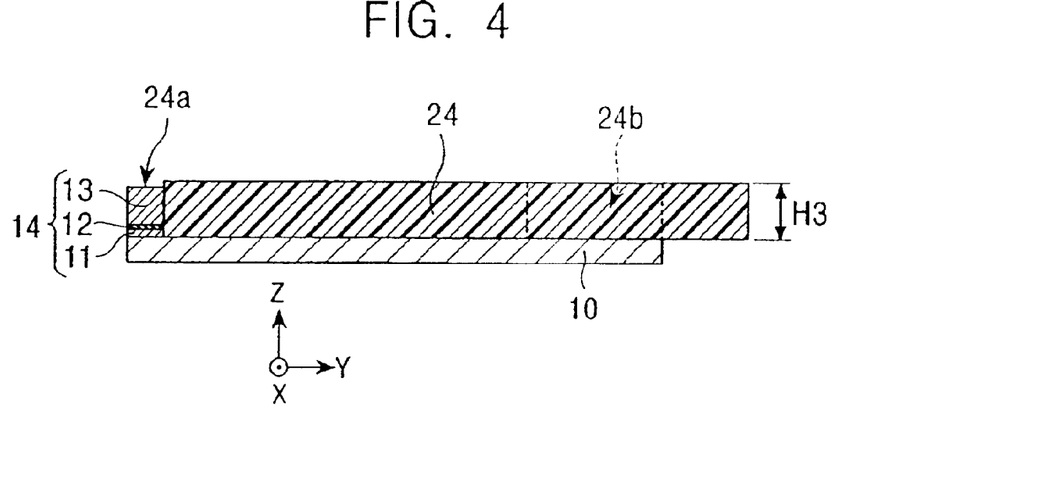
FIG. 4 shows the formation of the bottom core layer and track width control portion in a method for manufacturing the thin film magnetic head in FIG. 2 according to the present invention.

In FIG. 4, a resist layer 24 is first coated on the bottom core layer 10. The thickness dimension H3 of the resist layer 24 must be greater than at least the thickness dimension H4 of the track width control portion 14 of the completed thin film magnetic head shown in FIG. 1.

Next, a trench 24a is formed in the resist layer 24 by exposure and development to have a predetermined length dimension from the surface facing the recording medium in the height direction (the Y direction). The trench 24 also has a predetermined width dimension in the direction of the track width (the X direction). The track width control portion 14 is formed in the trench 24a.

As shown in FIG. 4, the track width control portion 14 comprises the bottom pole layer 11, the gap layer 12 and the top pole layer 13, which are formed in turn from the bottom by plating.

The film structure of the track width control portion 14 formed in the trench 24a is not limited to the three-layer structure. Namely, the track width control portion 14 may have any film structure as long as the track width control portion 14 comprises the bottom pole layer 11 connected to the bottom core layer 10 and/or the top pole layer 13 connected to the top core layer, and the gap layer 12 located between one of the core layers and the one of the pole layers or between both pole layers.

As described above, the gap layer 12 is preferably formed by plating together with the pole layers. In this case, as the nonmagnetic metallic material which is used for forming the gap layer 12 and which can be plated, at least one material is preferable selected from NiP, NiPd, NiW, NiMo, Au, Pt, Rh, Pd, Ru, and Cr.

Therefore, the bottom pole layer 11, the gap layer 12, and the top pole layer 13 can be formed by continuous plating.

In addition, a hole 24b is formed at the back end of the resist layer 24 in the height direction (the Y direction) by exposure and development, and the lifting layer 22 made of a magnetic material is formed in the hole 24b by plating.

Figure 5:
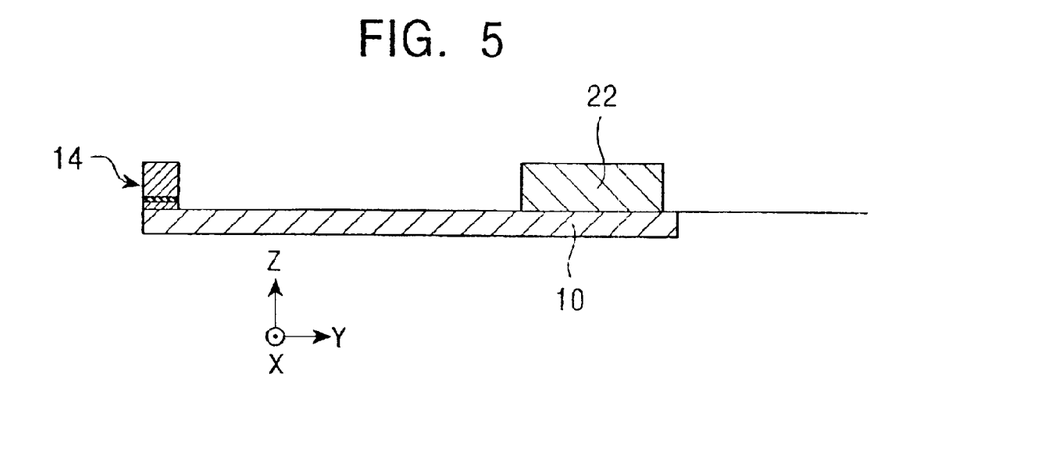
FIG. 5 shows the formation of the lifting layer in a method for manufacturing the thin film magnetic head in FIG. 2 according to the present invention.

FIG. 5 shows the state in which the resist layer 24 is removed. Track width control portion 14 is formed on the bottom core layer 10 near the ABS. The lifting layer 22 is formed away from the track width control portion 14 in the height direction.

The both sides (the sides in the X direction) of the track width control portion 14 shown in FIG. 5 can be ground by ion milling in the direction of the track width (the X direction shown in FIG. 5) to decrease the width dimension of the track width control portion 14. The width dimension of the track width control portion 14 which is ground by ion milling is defined as the track width Tw.

The top of the bottom core layer 10 which extends from the base end of the bottom pole layer 11 in the direction of the track width (the X direction) is also ground by the ion milling to form the inclined surfaces 10b at the top of the bottom core layer 10, as shown in FIG. 1.

Figure 6:
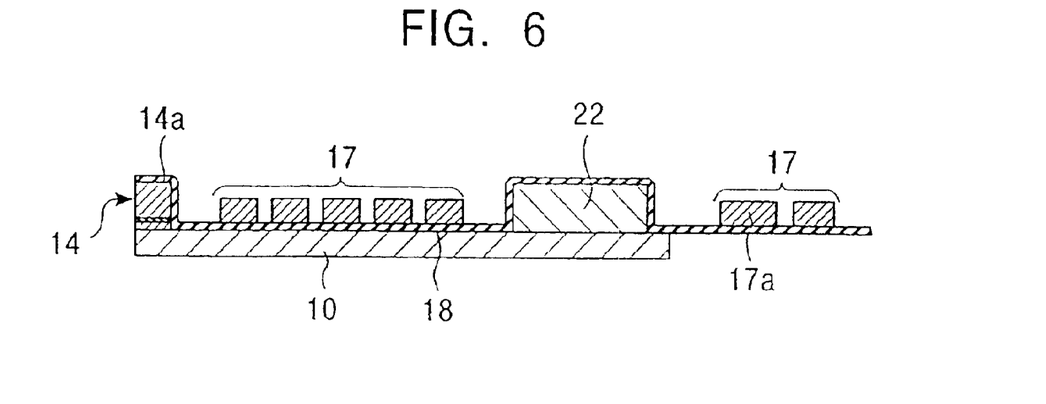
FIG. 6 shows the formation of an insulating base layer and a coil layer in a method for manufacturing the thin film magnetic head in FIG. 2 according to the present invention.

In the next step shown in FIG. 6, the insulating base layer 18 made of an insulating material is formed by sputtering to extent from the track width control portion 14 to the bottom core layer 10 and further extend in the height direction from the lifting layer 22.

As shown in FIG. 6, the coil center 17a is formed on the portion of the insulating base layer 18, which is located at the back of the lifting layer 22. The coil layer 17 is formed in a spiral pattern with the coil center 17a as the center.

In the present invention, in forming the coil layer 17, the coil layer 17 is formed so as to be located nearer the bottom core layer 10 than the junction surface 14a of the track width control portion 14.

Figure 7:
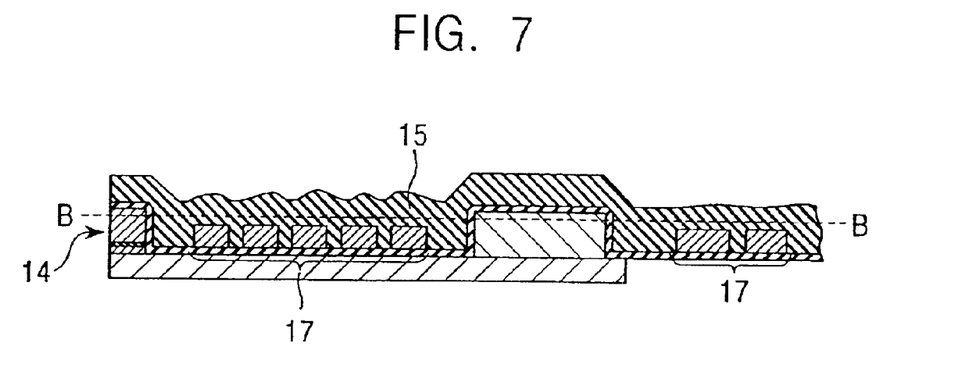
FIG. 7 shows the formation of an insulating layer in a method for manufacturing the thin film magnetic head in FIG. 2 according to the present invention.

In the next step shown in FIG. 7, the coil layer 17 is coated with the insulating layer 15. In this step, the track width control portion 14 and the lifting layer 22 are also covered with the insulating layer 15.

In the present invention, the insulating layer 15 is formed by sputtering an inorganic material. As the inorganic material, at least one material is preferably selected from $Al_2O_3$, SiN, and $SiO_2$.

Figure 8:
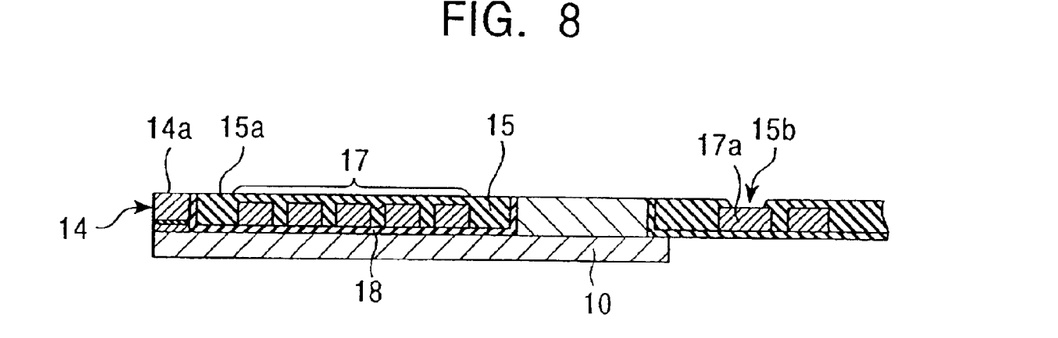
FIG. 8 shows the result of grinding an insulating layer in a method for manufacturing the thin film magnetic head in FIG. 2 according to the present invention.

As shown in FIG. 7, the surface of the inorganic insulating layer 15 is ground by a CMP technique to line B—B where the surface of the track width control portion 14 is exposed. The coil layer 17 is not exposed. FIG. 8 shows the state after grinding.

As shown in FIG. 8, the coil layer 17 formed on the bottom core layer 10 with the insulating base layer 18 provided therebetween is completely covered with the inorganic insulating layer 15.

Also, the surface 15a of the inorganic insulating layer 15 is planarized by the CMP method in the same plane as the junction surface 14a of the track width control portion 14.

In the step shown in FIG. 8, a hole (contact portion) 15b is formed in the portion of the insulating layer 15, which covers the coil center 17a of the coil layer 17.

Figure 9:
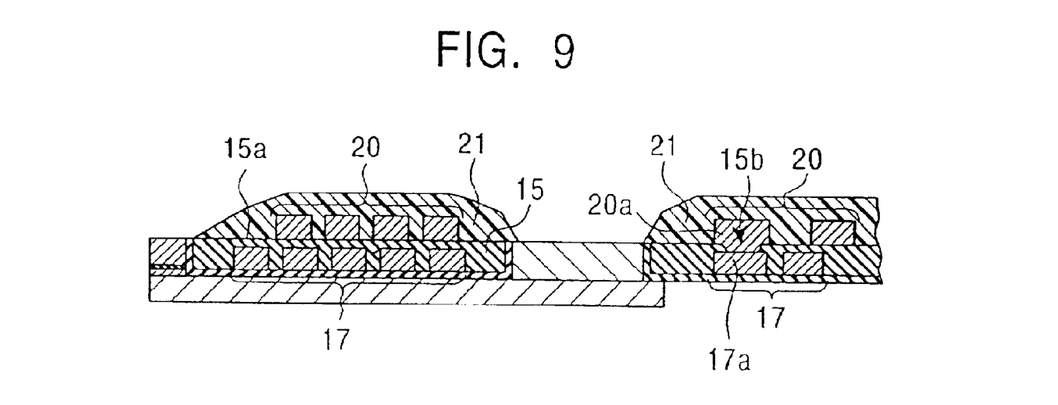
FIG. 9 shows the formation of a second coil layer in a method for manufacturing the thin film magnetic head in FIG. 2 according to the present invention.

In the next step shown in FIG. 9, the second coil 20 is formed in a spiral pattern on the inorganic insulating layer 15. As described above, the contact portion 15a is formed in the inorganic insulating layer 15 to be located above the coil center 17a of the first coil layer 17. The coil center 20a of the second coil layer 20 is electrically connected to the coil center 17a of the coil layer 17 through the contact portion 15b.

As described above, the surface 15a of the inorganic insulating layer 15 is planarized. Thus, the second coil layer 20 can be formed with high pattern precision on the inorganic insulating layer 15.

Figure 10:
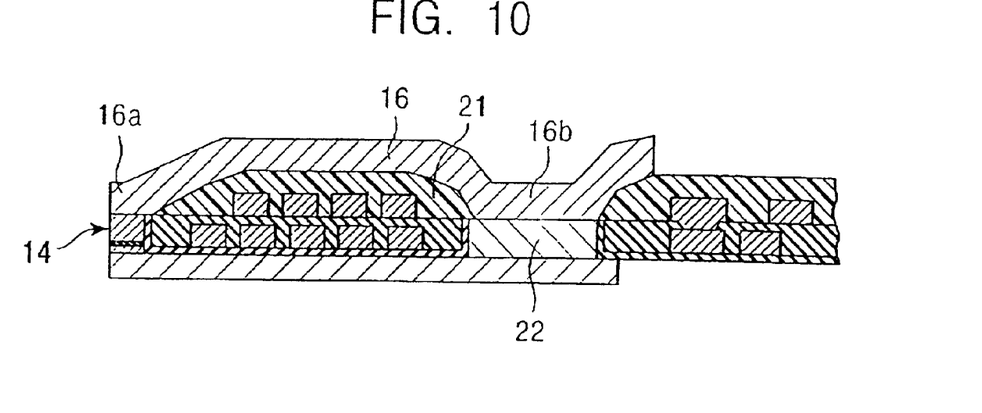
FIG. 10 shows the formation of a top core layer in a method for manufacturing the thin film magnetic head in FIG. 2 according to the present invention.

As shown in FIG. 9, the second coil layer 20 is covered with the insulating layer 21 made of an organic insulating material such as resist, polyimide, or the like. In the step shown in FIG. 10, the top core layer 16 is patterned on the upper insulating layer 21 by an existing method such as frame plating, or the like. As shown in FIG. 10, the top core layer 16 is formed so that the front end 16a contacts the track width control portion 14. The base end 16b magnetically contacts the lifting layer 22 formed on the bottom core layer 22.

The method of manufacturing the thin film magnetic head shown in FIG. 3 is next described below with reference to FIGS. 11 to 17 showing a series of steps.

Figure 11:
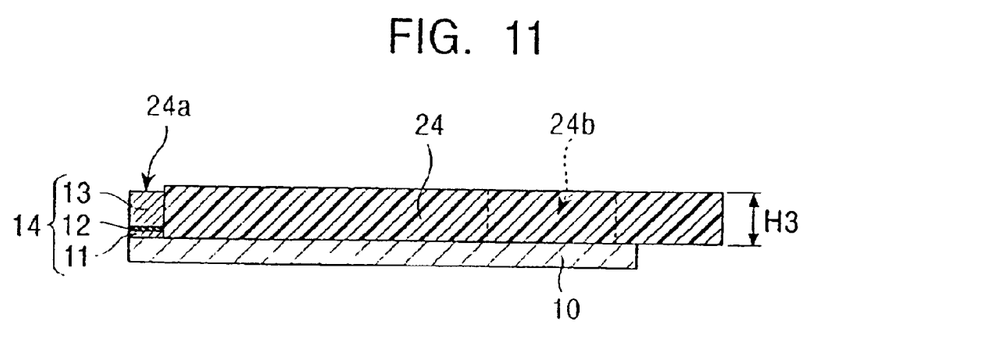
FIG. 11 shows the formation of a bottom core layer and a track width control portion in a method for manufacturing the thin film magnetic head in FIG. 3 according to the present invention.

In FIG. 11, a resist layer 24 is first coated on the bottom core layer 10. The thickness dimension H3 of the resist layer 24 must be greater than the thickness dimension H4 of the track width control portion 14 of the completed thin film magnetic head shown in FIG. 1.

Next, a trench 24a is formed in the resist layer 24 by exposure and development to have a predetermined length dimension from the surface facing the recording medium in the height direction (the Y direction). The trench 24a also has predetermined width dimension in the direction of the track width (the X direction). The track width control portion 14 is formed in the trench 24a.

The track width control portion 14 comprises the bottom pole layer 11, the gap layer 12 and the top pole layer 13, which are formed in turn from the bottom by plating.

The film structure of the track width control portion 14 formed in the trench 24a is not limited to the three-layer structure. Namely, the track width control portion 14 may have any film structure as long as the track width control portion 14 comprises the bottom pole layer 11 connected to the bottom core layer 10 and/or the top pole layer 13 connected to the top core layer, and the gap layer 12 located between one of the core layers and the one of the pole layers or between both pole layers.

The gap layer 12 is preferably formed by plating together with the pole layers. In this case, as the nonmagnetic metallic material which is used for forming the gap layer 12 and which can be plated, at least one material is preferably selected from NiP, NiPd, NiW, NiMo, Au, Pt, Rh, Pd, Ru, and Cr.

Therefore, the bottom pole layer 11, the gap layer 12, and the top pole layer 13 can be formed by continuous plating.

In addition, a hole 24b is formed at the back end of the resist layer 24 in the height direction (the Y direction) by exposure and development. The lifting layer 22 made of a magnetic material is formed in the hole 24b by plating.

Figure 12:
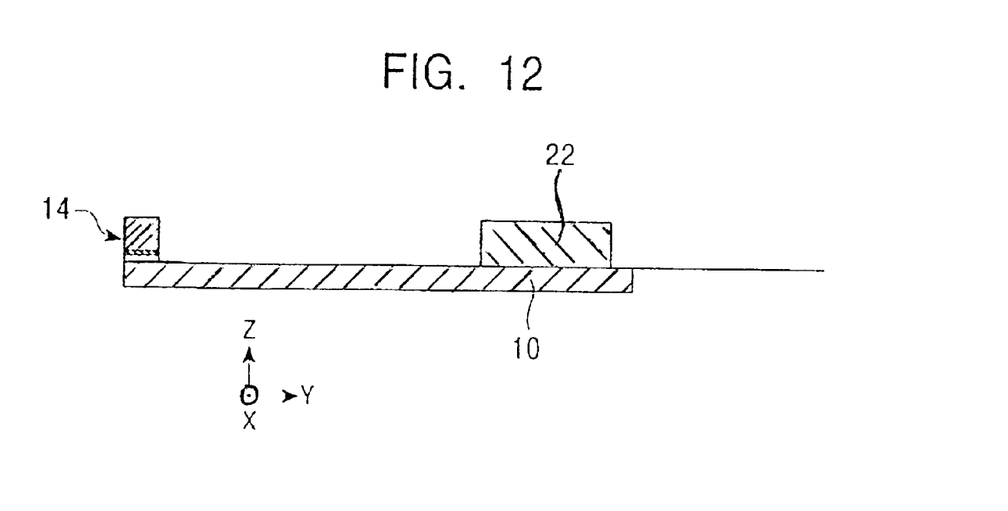
FIG. 12 shows the formation of a lifting layer in a method for manufacturing the thin film magnetic head in FIG. 3 according to the present invention.

FIG. 12 shows the state in which the resist layer 24 is removed. The track width control portion 14 is formed on the bottom core layer 10 near the ABS. The lifting layer 22 is formed away from the track width control portion 14 in the height direction.

The both sides (the sides in the X direction) of the track width control portion 14 shown in FIG. 12 can be ground by ion milling in the direction of the track width (the X direction shown in FIG. 12) to decrease the width dimension of the track width control portion 14. The width dimension of the track width control portion 14 which is ground by ion milling is defined as the track width Tw.

The top surface of the bottom core layer 10 which extends from the base end of the bottom pole layer 11 in the direction of the track width (the X direction) is also ground by the ion milling to form the inclined surfaces 10b at the top of the bottom core layer 10, as shown in FIG. 1.

Figure 13:
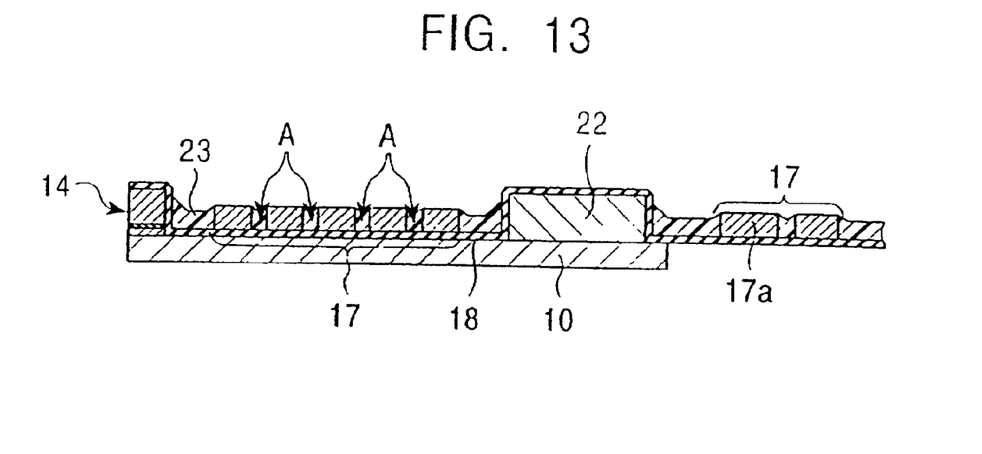
FIG. 13 shows the formation of an insulating base layer, a coil layer and an organic insulating layer in a method for manufacturing the thin film magnetic head in FIG. 3 according to the present invention.

In the next step shown in FIG. 13, the insulating base layer 18 made of an insulating material is formed by sputtering to extend from the track width control portion 14 to the bottom core layer 10 and further extend in the height direction from the lifting layer 22.

As shown in FIG. 13, the coil center 17a is formed. The coil layer 17 is formed in a spiral pattern with the coil center 17a as the center.

In the present invention, in forming the coil layer 17, the coil layer 17 is formed so as to be located nearer the bottom core layer 10 than the junction surface 14a of the track width control portion 14.

In the present invention, the pitch intervals A of the conductor of the coil layer 17 are filled with the organic insulating layer 23 made of an organic material such as resist, polyimide, or the like.

In the thin film magnetic head shown in FIG. 2, the coil layer 17 is covered with only the inorganic insulating layer 15 without using the organic insulating layer 23, as shown in the step shown in FIG. 7. However, the pitch intervals A of the conductor of the coil layer 7 may not be properly filled with the inorganic insulating layer 15, thereby causing the danger of forming voids in the pitch intervals A. Such voids are formed due to the sputtering process for forming the inorganic insulating layer 15. In the step shown in FIG. 13, in order to prevent the formation of the voids, the pitch intervals A of the conductor of the coil layer 17 are completely filled with the organic insulating layer 23 by coating an organic material such as resist or the like.

After the pitch intervals A are filled with the organic insulating layer 23, the organic insulating layer 23 is hardened by post baking (heat treatment).

Figure 14:
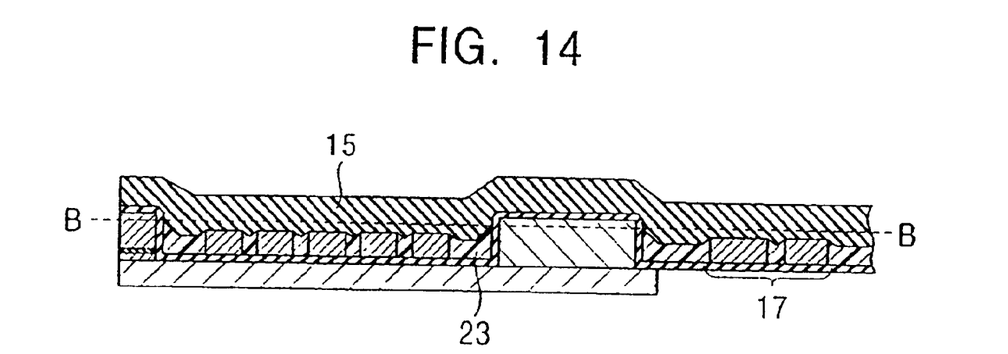
FIG. 14 shows the formation of an inorganic insulating material in a method for manufacturing the thin film magnetic head in FIG. 3 according to the present invention.

Then, in the step shown in FIG. 14, the coil layer 17 is covered with the inorganic insulating layer 15. At the same time, the track width control layer 14 and the lifting layer 22 are also covered with the inorganic insulating layer 15.

As described above, the organic insulating layer 23 is used for filling the pitch intervals A of the conductor of the coil layer 17. Thus the organic insulating layer 23 must not be formed to the formation position of the inorganic insulating layer 15 in place of the inorganic insulating layer 15.

The reason for this is that in grinding the insulating layer by the subsequent CMP method, the insulating layer comprising the organic insulating layer 23 cannot be appropriately polished due to the stickiness peculiar to organic materials. Therefore, in the present invention, the organic insulating layer 23 is used only for filling the pitch intervals A of the conductor of the coil layer 17. The inorganic insulating layer 15 is formed in the portion to be polished by the CMP method.

Figure 15:
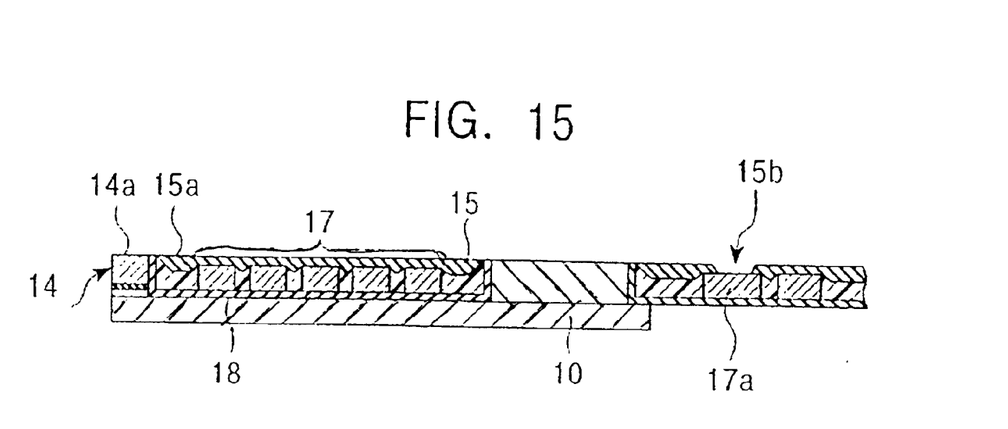
FIG. 15 shows the results of planarizing an inorganic insulating layer in a method for manufacturing the thin film magnetic head in FIG. 3 according to the present invention.

As shown in FIG. 14, the surface of the inorganic insulating layer 15 is then ground to line B—B by using the CMP technique to expose the surface of the track width control portion 14. FIG. 15 shows the state after grinding.

As shown in FIG. 15, the coil layer 17 formed on the bottom core layer 10. The insulating layer 23 of an organic material for filling the pitch intervals A of the conductor of the coil layer 17 are completely covered with the insulating layer 15 of an inorganic material.

Also, the surface 15a of the inorganic insulating layer 15 is planarized by the CMP method in the same plane as the junction surface 14a of the track width control portion 14.

In the step shown in FIG. 15, a hole (contact portion) 15b is formed in the portion of the inorganic insulating layer 15, which covers the coil center 17a of the coil layer 17.

Figure 16:
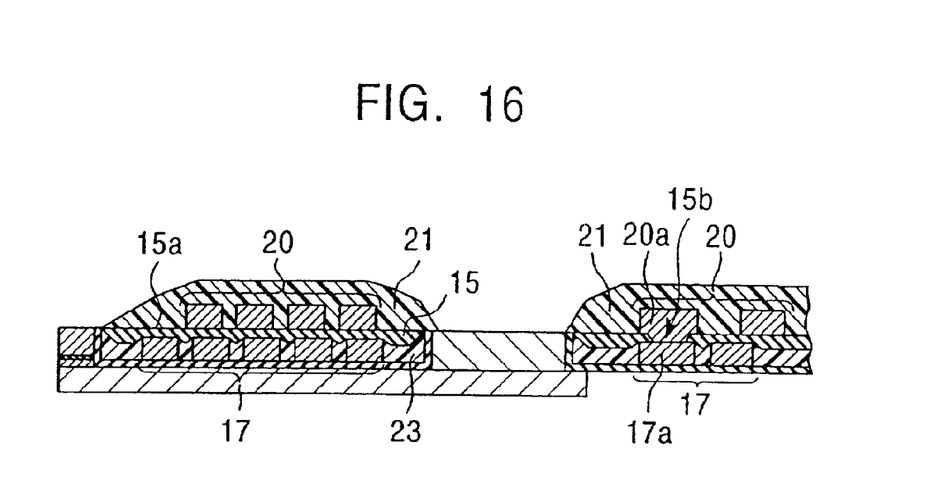
FIG. 16 shows the formation of a second coil layer in a method for manufacturing the thin film magnetic head in FIG. 3 according to the present invention.

In the next step shown in FIG. 16, the second coil 20 is formed in a spiral pattern on the inorganic insulating layer 15. As described above, the contact portion 15a is formed in the inorganic insulating layer 15 to be located above the wind center 17a of the first coil layer 17. The coil center 20a of the second coil layer 20 is electrically connected to the coil center 17a of the coil layer 17 through the contact portion 15b.

As described above, the surface 15a of the inorganic insulating layer 15 which covers the coil layer 17 is planarized. Thus the second coil layer 20 can be formed with high pattern precision on the inorganic insulating layer 15.

Figure 17:
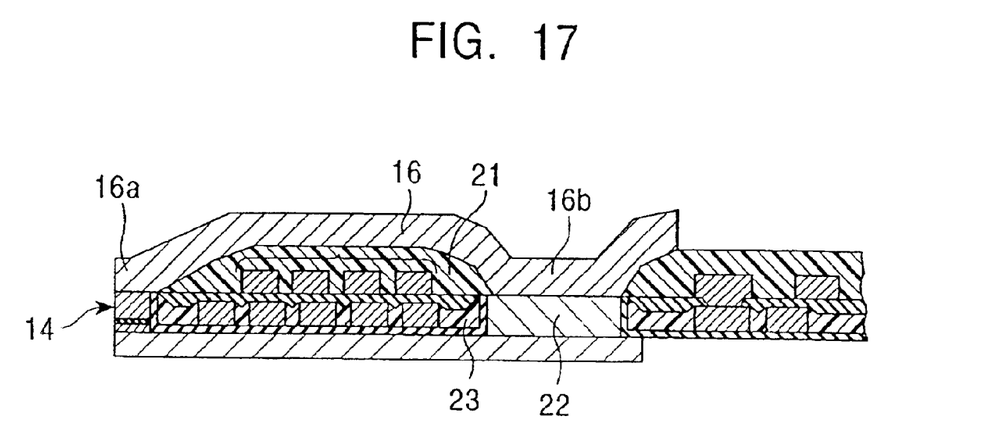
FIG. 17 shows the formation of a top core layer in a method for manufacturing the thin film magnetic head in FIG. 3 according to the present invention.

As shown in FIG. 16, the second coil layer 20 is covered with the upper insulating layer 21 made of an organic insulating material such as resist, polyimide, or the like. In the step shown in FIG. 17, the top core layer 16 is patterned on the upper insulating layer 21 by an existing method such as frame plating, or the like. As shown in FIG. 17; the top core layer 16 is formed so that the front end 16a contacts the track width control portion 14. The base end 16b magnetically contacts the lifting layer 22 formed on the bottom core layer 22.

Methods of manufacturing the thin film magnetic head shown in FIGS. 2 and 3 according to an embodiment of the present invention are described above. However, as described above, in the present invention, the track width control portion 14 is formed on the bottom core layer 10 by using the resist layer 24, and thus no layer is formed on the portion of the bottom core layer 10, on which the coil layer 17 is formed in the later step.

Therefore, in the present invention, the coil layer 17 can be formed on the bottom core layer 10 with the thin insulating base layer 18 provided therebetween. The coil layer 17 can be located at the back of the track width control portion 14 in the height direction. The junction surface 14a of the track width control portion 14 is the reference plane.

The coil layer 17 is located nearer the bottom core layer 10 than the reference plane.

Therefore, like in the present invention, with the coil having a two-layer laminated structure, the width dimension of the coil layer can be decreased. The height from the top of the bottom core layer 10 to the top of the upper insulating layer 21 covering the second coil layer 20 can be decreased, to appropriately shorten the magnetic path.

Assuming that the junction surface 14a of the track width control portion 14 is the reference plane, the coil layer barely rises from the reference plane. In the present invention, therefore, the magnetic path can be shortened to decrease inductance. At the same time, the top core layer 16 can be formed with high pattern precision.

In the present invention, the coil may have a single layer structure. In this case, the coil layer 17 is formed with a predetermined turn number. Then the top core layer 16 is formed in the step next to the step shown in FIG. 8 or 15 to complete the thin film magnetic head.

In the present invention, in the step shown in FIG. 5 or 12, both sides of the track width control portion 14 in the direction of the track width can be ground by ion milling. Therefore, in the present invention, the width dimension (i.e., the track width Tw) of the track width control portion 14 can be decreased to manufacture the thin film magnetic head adaptable to track narrowing. More specifically, the track width Tw of the track width control portion 14 is preferably about 0.7 µm or less, more preferably about 0.5 µm or less.

As described above, in the present invention, the coil layer is formed at the back of the track width control portion in the height direction. The junction surface between the track width control portion and the top core layer is the reference plane. The coil layer is located nearer the bottom core layer than the reference plane. Therefore, the height dimension from the top of the bottom core layer to the top of the insulating layer covering the coil layer can be decreased. The magnetic path can be shortened to decrease the inductance, thereby permitting the formation of the top core layer with high pattern precision.

Particularly, in the present invention, the coil layer preferably has a two-layer laminated structure because the width dimension of the coil layer can be decreased, and the magnetic path can be shortened to decrease inductance. Even in the two-layer laminated structure, the first coil layer is formed so that, assuming that the junction surface between the track width control portion and the top core layer is the reference plane, the first coil layer is located nearer the bottom core layer than the reference plane. Therefore, the height dimension from the top of the bottom core layer to the top of the insulating layer covering the coil layer (the second coil layer) can be decreased. The magnetic path can be further shortened. At the same time, the insulating layer covering the coil layer barely rises from the reference plane. Thus the top core layer can be formed with high pattern precision.

In the thin film magnetic head of the present invention, the track width Tw of the track width control portion can be adapted to track narrowing. Therefore, the present invention can provide a thin film magnetic head which is adaptable to higher recording densities and higher recording frequencies due to a decrease in inductance.

What is claimed is:

1. A method of manufacturing a thin film magnetic head comprising the steps of:

(a) forming a track width control portion on a bottom core layer with a predetermined width dimension and a predetermined length from the surface facing a recording medium in the height direction, the track width control portion comprising one of a first combination, a second combination, and a third combination, wherein the first combination is a bottom pole layer, a nonmagnetic gap layer, and a top pole layer, the second combination is the bottom pole layer and the nonmagnetic gap layer, and the third combination is the nonmagnetic gap layer and the top pole layer;

(b) forming an insulating base layer on a portion of the bottom core layer, the portion located behind the track width control portion in the height direction;

(c) forming a coil layer on the insulating base layer, wherein the coil layer is nearer the bottom core layer than a top surface of the track width control portion;

(d) forming at least one insulating layer to cover the track width control portion and the coil layer;

(e) planarizing the top surface of the at least one insulating layer, wherein the top surface and an upper surface of the track width control portion are in a reference plane; and (f) forming a top core layer extending from the track width control portion to the at least one insulating layer, wherein step (a) is performed prior to performing step (c).

2. A method of manufacturing a thin film magnetic head according to claim 1, wherein the step (d) further comprises the substep of forming an inorganic insulating layer as the at least one insulating layer, and wherein the step (e) further comprises polishing the at least one insulating layer, wherein the upper surface of the track width control portion and the top surface of the inorganic insulating layer are in the reference plane.

3. A method of manufacturing a thin film magnetic head according to claim 1, wherein the step (d) further comprises the substeps of (d1) providing at least one pitch interval of the coil layer with an organic insulating layer, and (d2) forming an inorganic insulating layer on the organic insulating layer and the coil layer; and wherein the step (e) further comprises polishing the inorganic insulating layer, wherein the upper surface of the track width control portion and the top surface of the inorganic insulating layer are in the reference plane.

4. A method of manufacturing a thin film magnetic head according to claim 1, wherein step (e) further comprises the substep of:

(e1) forming a second coil layer on one of the top surface of the at least one insulating layer and an insulating interlayer provided on the top surface, wherein the second coil layer is electrically connected to the coil layer.

5. A method of manufacturing a thin film magnetic head according to claim 1, wherein the step (a) comprises forming the nonmagnetic gap layer by plating together with at least one of the pole layers.

6. A method of manufacturing a thin film magnetic head according to claim 1, wherein the nonmagnetic gap layer is formed from a nonmagnetic metallic material which can be plated, wherein the nonmagnetic metallic material is at least one material selected from NiP, NiPd, NiW, NiMo, Au, Pt, Rh, Pd, Ru, and Cr.

* * * * *